United States Patent
Côté

(10) Patent No.: US 7,336,851 B1
(45) Date of Patent: Feb. 26, 2008

(54) INTERACTIVE TOOL FOR REMOVAL OF ISOLATED OBJECTS ON RASTER IMAGES

(75) Inventor: Stéphane Côté, Lac Beauport (CA)

(73) Assignee: Bentley Systems, Inc., Exton, PA (US)

( * ) Notice: Subject to any disclaimer, the term of this patent is extended or adjusted under 35 U.S.C. 154(b) by 860 days.

(21) Appl. No.: 10/635,570

(22) Filed: Aug. 7, 2003

(51) Int. Cl.
*G06K 9/20* (2006.01)
*G06K 9/36* (2006.01)

(52) U.S. Cl. .................... 382/282; 382/284

(58) Field of Classification Search ........... 382/100, 382/103, 276, 282, 283, 284; 345/620, 625
See application file for complete search history.

(56) References Cited

U.S. PATENT DOCUMENTS

| | | | | |
|---|---|---|---|---|
| 4,855,934 A | * | 8/1989 | Robinson | 345/582 |
| 5,185,808 A | * | 2/1993 | Cok | 382/284 |
| 6,269,195 B1 | * | 7/2001 | Gonsalves et al. | 382/284 |
| 6,987,520 B2 | * | 1/2006 | Criminisi et al. | 345/629 |
| 7,088,870 B2 | * | 8/2006 | Perez et al. | 382/284 |
| 2003/0210828 A1 | * | 11/2003 | Georgiev et al. | 382/254 |

* cited by examiner

*Primary Examiner*—Colin LaRose
(74) *Attorney, Agent, or Firm*—Venable LLP; James R. Burdett; Caroline J. Swindell (57) ABSTRACT

A method for removing an area from a raster image includes defining a target area in a raster image, where the raster image has a plurality of pixels and an object area made up of a first subset of the pixels. The target area comprises the object area enclosed by a contour. A resizable target feathering area is defined, enclosing the target area, having an inner edge abutting the contour enclosing the target area, and made up of a second subset of pixels not including the first subset of pixels. A movable template area is defined, made up of a third subset of pixels. A template feathering area is defined, made up of a fourth subset of pixels. The template area pixels are copied to the target area and the template feathering area pixels are copied to the target feathering area, replacing the first subset of pixels of the object area. The template area is selected.

37 Claims, 6 Drawing Sheets

*PRIOR ART*

FIG. 4A

*PRIOR ART*

FIG. 4B

*PRIOR ART*

INTERACTIVE TOOL FOR REMOVAL OF ISOLATED OBJECTS ON RASTER IMAGES

BACKGROUND OF THE INVENTION

1. Field of the Invention

The present invention relates generally to the manipulation of raster images, and more particularly to removing isolated objects from raster images.

2. Related Art

It is often desirable in image editing to remove objects from an image. Once the object is removed, however, it can be difficult to fill in the background left by the removed object and make the image look as if the object had never been there.

Several software packages make it possible to remove, at least somewhat, an object from an image. For example, MicroStation Descartes, available from Bentley Systems Inc., is an image display and editing application that provides two different tools for raster object removal. The first is a remove speckle tool that is used to remove objects within an image that fall within a user selectable radius and in a selected range of colors. The main limitation of the remove speckle tool is that it replaces the object with a uniform color. If the background is not a uniform color, the replacement creates a visible seam, i.e., a noticeable transition from the background to the replacement area, usually on either side of a line. Therefore, uniform color replacement creates a seamless replacement only for images with a uniform background (such as maps, engineering plans, etc). The second is a copy/paste tool that is used to copy a portion of an image to another location within the same image. The copy/paste tool removes an object from the image by pasting another part of the image over the object to be removed. However, since the tool requires the user to first copy an area, then to paste it onto the area to be removed, it requires a lot of trial and error effort before finding the best possible match that creates seamless removal of the object. Further, even at best it is not always able to create a seamless removal.

Corel Photo-Paint, an image editing application developed by Corel Corporation, has a clone tool that lets a user copy an image region onto another image region. The clone tool allows the removal of a portion of an image by replacing the removed region with a clone of another region. The clone tool is disadvantageous because it requires the user first to select the area to be cloned and then select the area where the cloned area is pasted, forcing the user to "guess" in advance what part of the image could best replace the region to be removed. The use of the clone tool for removing objects involves a lot of trial and error effort, especially when trying to minimize the seam between the original image and the replaced portion.

Adobe PhotoShop, an image editing application developed by Adobe Systems Inc., has a tool similar to the Corel clone tool, called clone stamp. The clone stamp tool operates in a similar manner to the clone tool and has the same limitations. Like the clone tool of Corel Photo-Paint, the clone stamp tool cannot be used easily to remove objects while minimizing the seam.

Once the object is removed from the image, one solution for minimizing the seam left by the removal is a feathering tool, such as the ones provided in Adobe PhotoShop and Corel Photo-Paint. Feathering is well known to those of ordinary skill in the art. In feathering, a user defines a feathering area around a "fence" in the image. The fence typically corresponds to the seam left by the replacement. Then, whatever process is applied to the pixels inside the fence is also applied in the feathering area. Within the feathering area, the intensity of the process is faded out from the fence to the outer part of the feathering area. In this way, the seam between the replaced object and the remaining image can be smoothed out.

The problem with using current feathering tools is that the user must manually set a value for the width of the feathering area. Having a larger feathering area generally produces a smoother seam, however, if the feathering area is too large, image elements may be feathered that should not have been feathered. When that occurs, the user must perform the feathering process again with a different value for the width of the feathering area until a satisfactory result is achieved. This process can take a long time and involve a lot of trial and error.

What is needed then is an improved method of removing objects from raster images that overcomes the shortcomings of conventional solutions.

SUMMARY OF THE INVENTION

In an exemplary embodiment of the present invention a system, method and computer program product for removing an object from a raster image is disclosed.

In an exemplary embodiment, the present invention replaces a removed object with another portion of the image, e.g. part of the nearby background, and feathers the edges of the replaced area. The user can select the appropriate background "fill" by moving the mouse pointer or input device pointer around on areas of the image. As the user moves the mouse, the area surrounding the pointer is copied into the space left by the removed object. The user can move the mouse pointer to any point in the image until a suitable background section is found. Once the background is placed, the edges of the replaced area are feathered.

The feathering process allows the user to change the size of the feathering area interactively by moving the input device. The user does not need to set a width parameter, try the replacement, and then reset the width parameter when the previous value did not work. Instead, the user moves the mouse or other input device until the desired result is achieved.

One advantage of the described system over prior solutions is interactivity. When the user wants to hide a given portion of an image, he can find interactively the region that best fits the object to be removed (the result is displayed in real time), before actually replacing the portion of the image. This results in a huge gain in productivity.

Another advantage of the described system is texture compatibility. Unlike MicroStation Descartes' Remove Speckle tool that can remove small elements by replacing them with a uniform color, the present invention may include a method for copying the data of another region of the image, therefore creating a realistic removal. Moreover, a smoothing process decreases the appearance of seams.

In an exemplary embodiment, the present invention can be a method for removing an area from a raster image, comprising the steps of: defining a target area in a raster image, the raster image having a plurality of pixels and an object area comprised of a first subset of the pixels, and the target area comprising the object area enclosed by a polygon; defining a resizable target feathering area enclosing the target area and having an inner edge abutting the polygon enclosing the target area; defining a movable template area comprising a second subset of pixels and a template feathering area comprising a third subset of pixels; copying the template area pixels to the target area and the template feathering area pixels to the target feathering area, replacing the first subset of pixels of the object area and the second subset of pixels of the target feathering area; and selecting the template area.

In another exemplary embodiment, the present invention can be a computer system for removing an object from a raster image, comprising: a target area definition tool, operative to define a polygonal target area in a raster image, wherein the target area and the raster image comprise a plurality of pixels; a feathering area definition tool, operative to define a target feathering area around the target area; a template choice tool, operative to replace pixels in the target area with pixels in a template; and means for selecting the template.

In another exemplary embodiment, the present invention can be a computer useable information storage medium storing computer readable program code for causing a computer to perform the steps of: defining a target area in a raster image, the raster image having a plurality of pixels and an object area comprised of a first subset of the pixels, and the target area comprising the object area enclosed by a polygon; defining a resizable target feathering area enclosing the target area and having an inner edge abutting the polygon enclosing the target area; defining a movable template area and a template feathering area from a second subset of the plurality of pixels; copying the template area pixels to the target area and the template feathering area pixels to the target feathering area, replacing the first subset of pixels of the object area; and selecting the template area.

In another exemplary embodiment, the present invention can be a method in a computer for removing an area from a raster image, comprising the steps of: causing an image to be displayed to a user; providing a target area definition tool to the user; receiving target input from the user via the target area definition tool; defining a target area in the image based on the target input; providing a feathering area definition tool to the user; receiving feathering input from the user via the feathering area definition tool; defining a feathering area in the image based on the feathering input; providing a template choice tool to the user; receiving template area and template feathering area input from the user via the template choice tool; and causing an area defined by the template area and template feathering area input to be displayed in the target area and the feathering area, respectively.

In another exemplary embodiment, the present invention can be a method for adjusting a feathering area in a raster image, comprising the steps of: (a) receiving a first input from a user selecting a processing area on which to apply a process in a raster image, wherein said raster image comprises a plurality of pixels, said processing area comprises a subset of said plurality of pixels; (b) defining a feathering area enclosing said processing area, having an inner edge abutting said processing area, and comprising a second subset of pixels not including said first subset of pixels; (c) receiving a second input from the user by way of an input device movement in relation to a center of said processing area; (d) changing the size of said feathering area based on said input device movement; (e) applying said process on said processing area of said raster image; (f) feathering the intensity of the application of said process on said second subset of pixels in said feathering area; (g) repeating said steps (c)-(d) and (f) each time the input device is moved to a different location in said raster image; and (h) receiving a third input from the user accepting the results of said feathering.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements. The left most digits in the corresponding reference number indicate the drawing in which an element first appears.

DEFINITIONS

As used herein, the following terms shall have the following meanings:

Target/target area: region of a raster image to be removed and replaced by some other raster data.

Template: region of an image that has the same size and shape as the target, and which is copied and pasted onto the target.

Target Feathering Area: region of an image around the target that defines the area in which pixels will be pasted with partial transparency.

Template Feathering Area: region of an image located around the template, that has the same size and shape as the Target Feathering Area, and that defines the area from which pixels will be copied and pasted with partial transparency onto the Target Feathering Area.

Target Area Definition Tool: An interactive tool that lets the user define the location, shape and size of the target area.

Feathering Area Definition Tool: An interactive tool that lets the user define the size of the feathering area around the target.

Template Choice Tool: An interactive tool that lets the user choose the location of the template area.

Computer: refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a workstation; a micro-computer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network. A computer can also be a personal digital assistant (PDA).

Computer-readable medium: refers to any storage device used for storing data accessible by a computer. Examples of a computer-readable medium include: a magnetic hard disk; a floppy disk; an optical disk, such as a CD-ROM, a CD-RW, and a DVD; a magnetic tape; a memory chip; and a carrier wave used to carry computer-readable electronic data, such as those used in transmitting and receiving e-mail or in accessing a network.

Input device: refers to a device, with its accompanying software drivers, used to interact with a computer system and provide input and instruction to the computer and especially to move a cursor on a display. Examples of input devices include: a computer mouse, a keyboard, a computer drawing tablet, a joystick, and a microphone.

Software: refers to prescribed rules to operate a computer. Examples of software include: software; code segments; instructions; computer programs; and programmed logic.

Computer system: refers to a system having a computer, where the computer comprises a computer-readable medium embodying software to operate the computer.

Network: refers to a number of computers and associated devices that are coupled by communication facilities. A network involves permanent connections such as cables or temporary connections such as those made through telephone or other communication links. The network is the infrastructure that allows communication and exchange of information between two or more computers. Examples of a network include: a local area network (LAN), a wide area network (WAN), Ethernet, an intranet, an internet, such as the Internet, wireless or satellite communication, and a combination of networks.

DETAILED DESCRIPTION OF AN EXEMPLARY EMBODIMENT OF THE PRESENT INVENTION

A preferred embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

An exemplary embodiment of the present invention operates on a computer system having a display and an input device. The computer system can be stand-alone or networked to other computer systems. The raster images and software implementing the present invention can be stored on the computer readable media of the computer system or on a computer system on a network.

Figure 1:
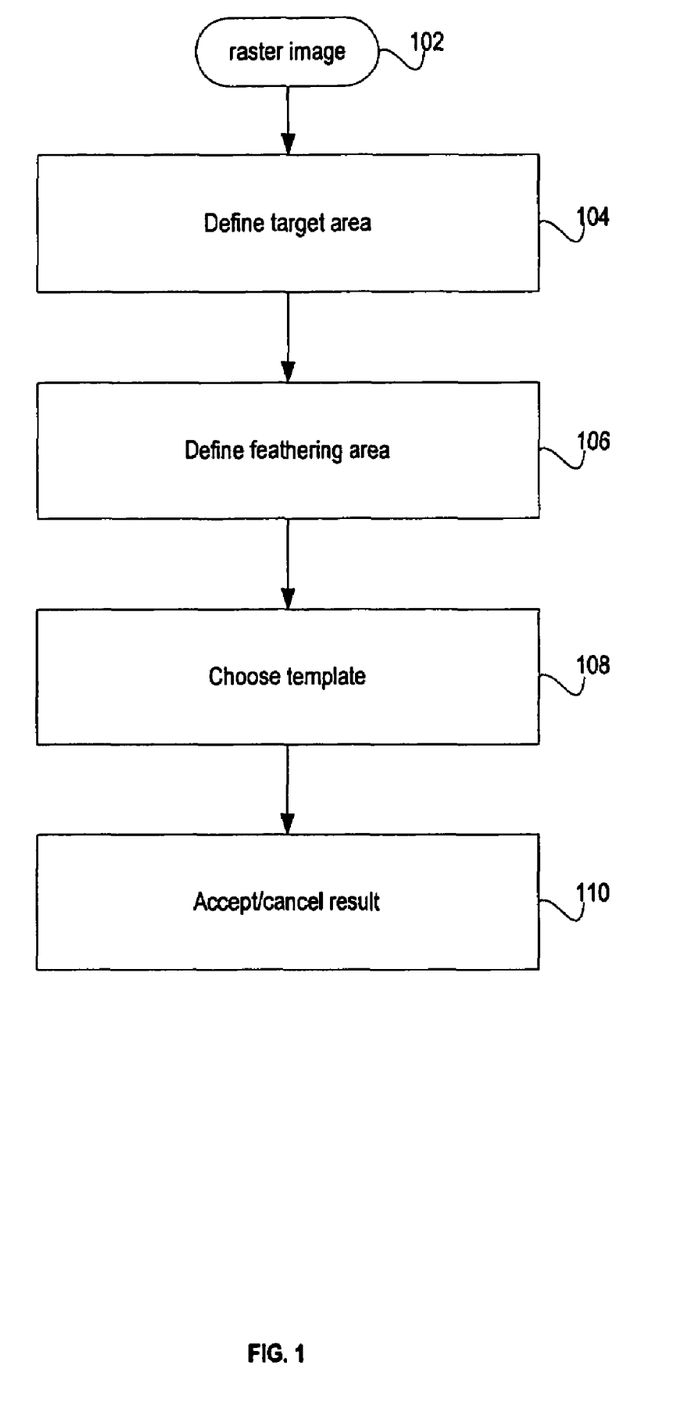
FIG. 1 depicts a flow chart of an exemplary embodiment of the method of the present invention.

FIG. 1 shows a flow chart of an exemplary embodiment of the method of the present invention. Starting with a raster image 102 shown on a display, the first step is target definition 104. Target definition is the selection of the object to be removed from an image. The next step is defining a feathering area 106. The feathering area is based on the shape of the object target. The feathering area can range in size from almost identical in size to the target, to much larger in size than the target. Next, the user selects a portion of the image to fill in the "hole" left by the removal of the object, in step 108. The image portion selected is called the template. Finally, the resulting removal and fill is either accepted or canceled by the user in step 110. Each step is described in further detail below.

In the target definition step 104, the user selects the object to be removed by defining a target outline surrounding the object, as seen in FIGS. 2A-2G. The user can define the target area using a target area definition tool. The target area definition tool provides a graphical user interface (GUI) to a user that allows the user to select a portion of the image to remove. The target area definition tool receives input from the user, for example, from an input device. The target area can be of any shape, e.g. a circle, a square, a rectangle or a polygon. Generally, the smaller the target area, the easier it is for the user to find a good potential template to replace it. Therefore, an ideal target area shape closely matches the edge of the object to be removed.

Figure 2A:
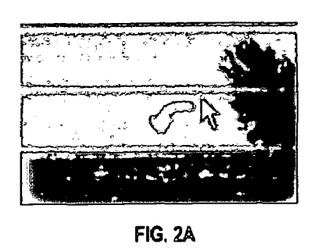
FIGS. 2A-G depict an exemplary embodiment of defining a target area polygon according to the present invention.
Figure 2B:
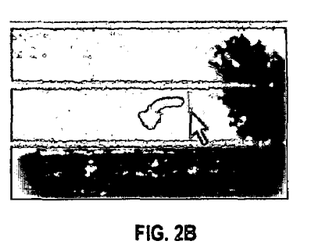
Figure 2C:
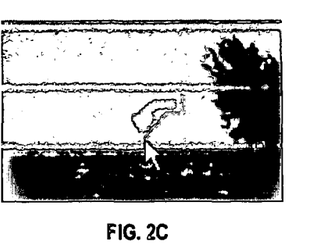
Figure 2D:
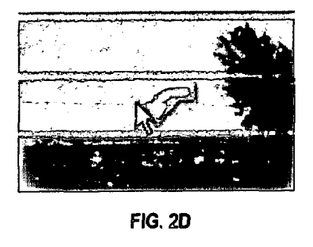
Figure 2E:
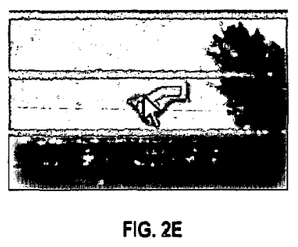
Figure 2F:
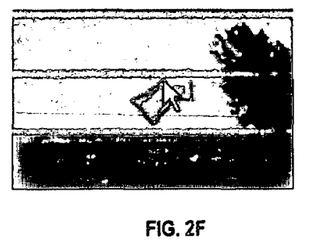
Figure 2G:
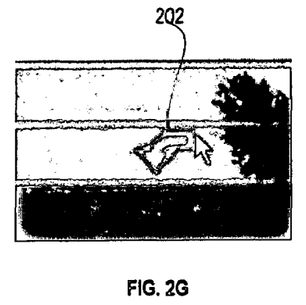

In an exemplary embodiment, to define the target area, the user positions a pointer on the raster image using an input device, for example, a computer mouse. The user clicks the mouse button and sets a first vertex of a polygon that defines the target area, as seen in FIG. 2A. The pointer is moved on the image to define the target area. Clicking the mouse button defines the boundaries of the target area. The user continues by moving the input device pointer to another location and selecting the second location by clicking the mouse button, as seen in FIG. 2B. This second selection creates a second vertex and connects the first and second vertices with a line. The user then continues moving the pointer and making selections until the entire object is surrounded by the polygon 202, as seen progressively in FIGS. 2C-2G.

Figure 3A:
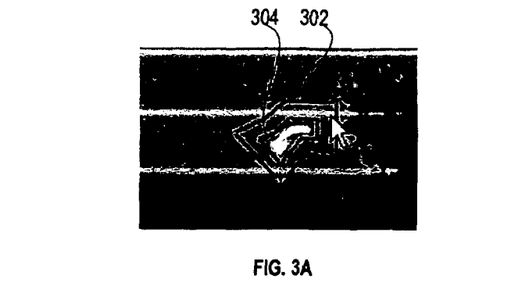
FIGS. 3A-3E depict an exemplary embodiment of a feathering area and resizing a feathering area according to the present invention.
Figure 3B:
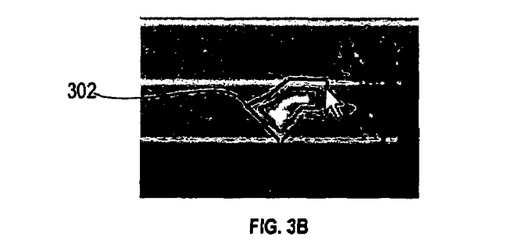
Figure 3C:
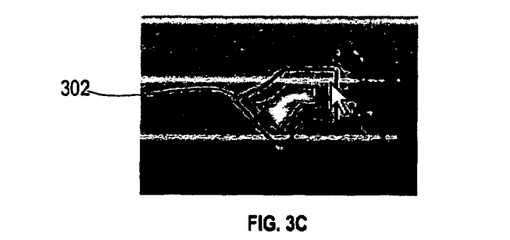
Figure 3D:
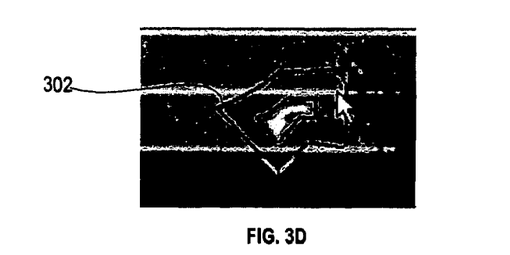

Once the target area is defined by the polygon, the next step 106 is to define the size of the feathering area. A feathering area definition tool lets the user define the size of the target feathering area. In an exemplary embodiment, as seen in FIG. 3A, as soon as the target polygon is closed in the target definition step 104, the feathering area definition tool becomes activated. The feathering area definition tool automatically draws a feathering polygon 302 that is initially the same size as the target area polygon 304. The shape of the target feathering area is a polygon 302 that has the same number of sides as the target area polygon 304, each side being parallel to the corresponding side in the target area polygon. Sides of the feathering polygon are all at the same distance from their corresponding side in the target polygon. Therefore, the feathering polygon is larger than the target area polygon, similar in shape, and centered on the same point.

Figure 3E:
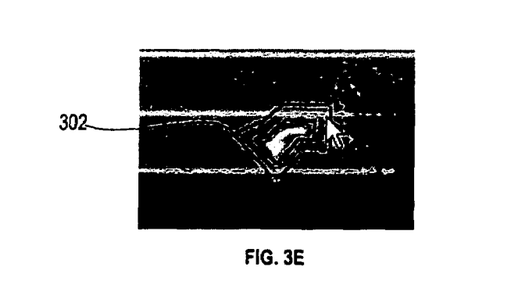

The user can then adjust the size of the feathering area via the feathering area definition tool by using the input device. As the user moves the mouse away from the target area polygon, for example, as measured from the starting vertex, the target feathering polygon increases in size. If the user moves the mouse back toward the starting vertex of the target area polygon, the target feathering polygon decreases in size. When the user is satisfied with the size of the target feathering polygon, he clicks the left mouse button to select the feathering area. FIGS. 3B-3E show the selection of the size of the feathering area. As the input device pointer is moved away from the target area in FIGS. 3B-3D, the feathering area polygon 302 grows larger. The sides of the polygon that bounds the feathering area remain parallel to their corresponding sides in the target area polygon. In FIG. 3E, the input device pointer has been moved closer to the target area, and the feathering area is correspondingly smaller.

In an exemplary embodiment, the adjustable feathering area can used independently of the object replacement feature of the present invention, for example, if a user wants to paste an image portion into another image, or if the user wants to apply a color or intensity modification to a set of pixels. The user can paste the image portion, and then move the input device pointer as described with respect to FIGS. 3B-E. The pasted image portion acts similarly to the target area, and the feathering area is centered on the pasted image portion and can be enlarged or shrunk according to the input device movement. While the feathering area size is being adjusted, the application of the process (e.g. pasting, color or intensity modification) to the pixels within the feathering area is feathered, to show the user the end result of feathering. This allows the user to find the appropriate feathering area size without having to repeat the copying and pasting (or other process) operation for each new feathering area size value.

Figure 4A:
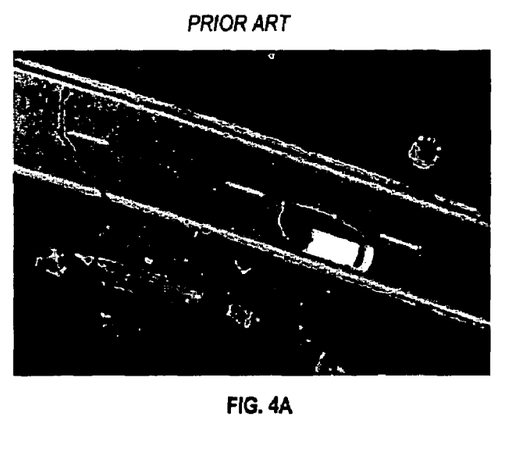
FIGS. 4A-C depict an exemplary embodiment of conventional feathering.
Figure 4B:
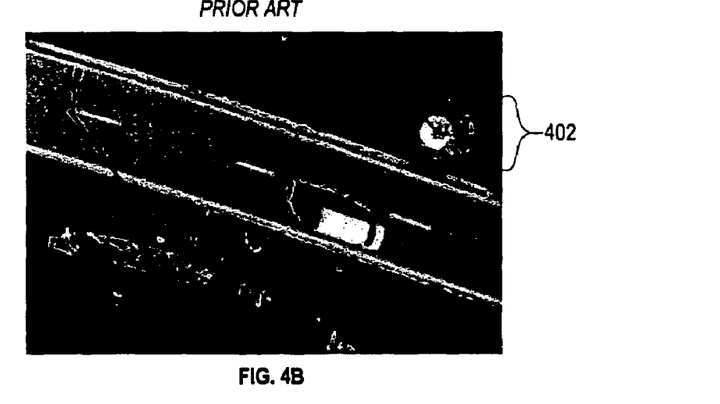
Figure 4C:
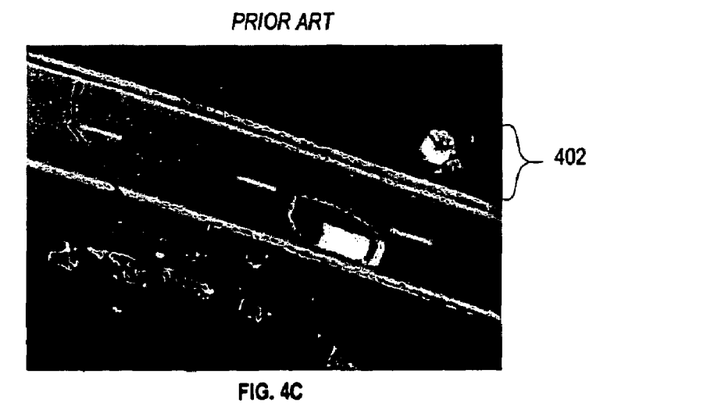

FIGS. 4A-C show an exemplary application of a conventional feathering application for local contrast enhancement. FIG. 4A is the original image. In FIG. 4B, the contrast of all the pixels within circle 402 has been enhanced without feathering outside of the circular "fence". In FIG. 4C, the contrast has been enhanced within the circle 402 with feathering around the fence. The result, in FIG. 4C, is a better integration of the enhanced pixels with the rest of the image.

When the target area and feathering area are defined, the user, in step 108, then selects a template to replace the object to be removed, using the template choice tool described below. The template comprises two parts: a template area corresponding to the target area, and a template feathering area corresponding to the target feathering area. The pixels of the template area, which has the same size and shape as the target area, are copied onto the target area exactly. The template area is copied in near real time as the user changes the position of the template area by moving the input device pointer. In addition to copying pixels from the template to the target area, pixels located inside the template feathering area are also copied and pasted on the fly onto the target feathering area. The pixels from the template feathering area are not copied exactly in the way that the pixels inside the template area are, but are rather copied and pasted with a varying degree of transparency: the further away pixels of the feathering area are from the template area, the more transparency is used when pasting them.

In an exemplary embodiment of the present invention, a template choice tool is automatically activated as soon as the target and feathering areas are defined. The template choice tool allows the user to select a location for the template. When the template choice tool is activated, the user is presented with a floating polygon representing the size and shape of the target defined using the target area definition tool and a floating polygon representing the size and shape of the feathering area. The polygons can be moved to different parts of the image with the input device.

FIGS. 5A-5H illustrate an exemplary embodiment of locating a template area using the floating polygons. The input device pointer 502 carries the shape of both the target polygon 304 and the feathering area polygons 302 (collectively 504). These floating polygons 504 indicate the location of the template and of the template feathering area polygon, and show the user what will be copied and pasted onto the target if the template is selected. (For convenience, in FIGS. 5A-5H, the target area is generally indicated by circle 506. However, the circle is not itself part of the present invention.) The user can then see whether the template data fits well with the surrounding area of the target. If not, he can choose another location.

Figure 5A:
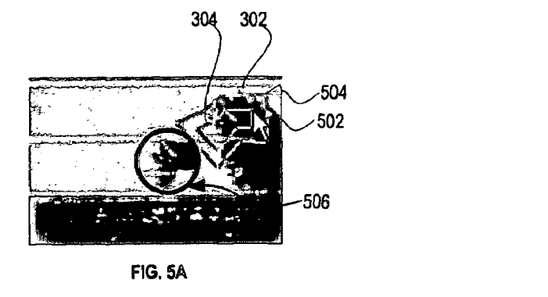
FIGS. 5A-H depict an exemplary embodiment of selecting a template according to the present invention.
Figure 5B:
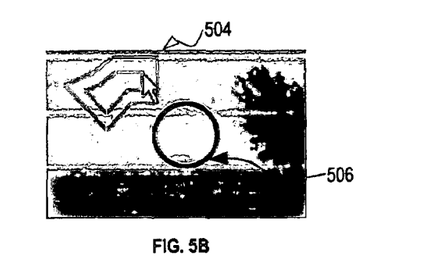
Figure 5C:
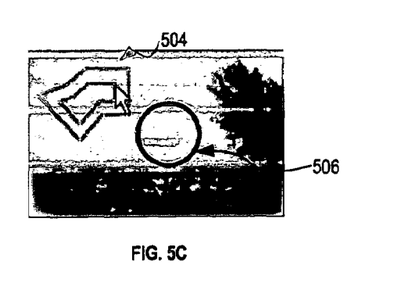
Figure 5D:
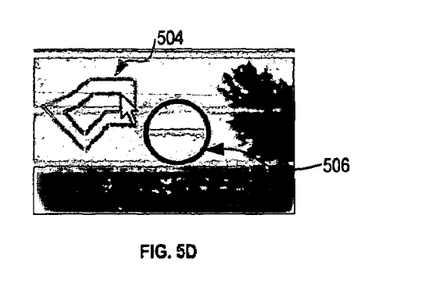
Figure 5E:
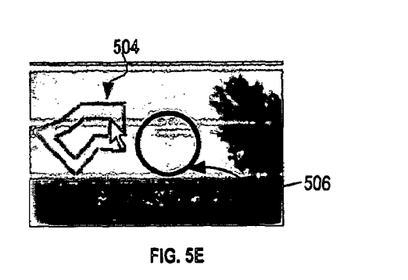
Figure 5F:
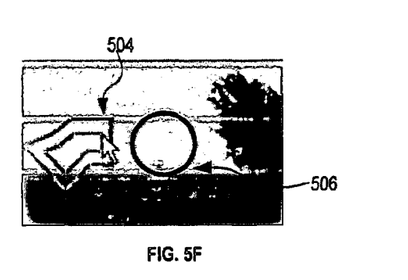
Figure 5G:
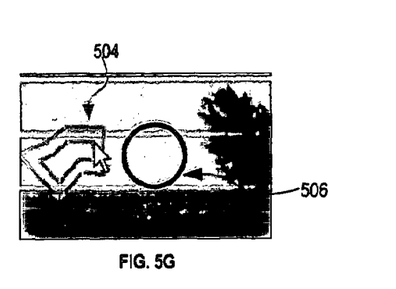
Figure 5H:
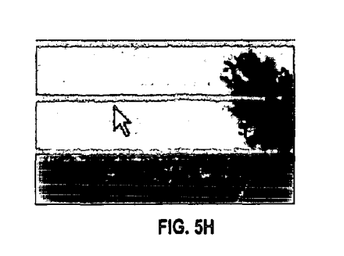

For example, in FIG. 5A, the floating polygons 504 are positioned "over" an area showing the shadow of a tree. The target area shows a copy of the image "under" the floating target polygon 304. In FIG. 5B, the floating polygons are over the road portion of the image, and those road pixels are copied into the target area. In FIG. 5C, the floating polygons 504 are moved further down in the image to encompass more of the central horizontal white line, a portion of which is copied as-is into the target area. In FIG. 5D, the floating polygons 504 are moved still further down, encompassing even more of the central white line, and the target area is updated accordingly. In FIG. 5E, the floating polygons are moved still further down. The feathering process can be seen just inside the top of circle 506, where part of the central white line is blurred and faded by the copying of feather pixels from the template feathering area. In FIG. 5F, where the floating polygons are moved still further down, the feathering process is again noticeable as feathered pixels from the dark bottom area of the image are copied into the feathering area seen within circle 506. In FIG. 5G, the user has positioned the floating polygons 504 over a road area that provides a good template for the target area. FIG. 5H shows the result of selecting the template in FIG. 5G.

Alternatively, the user can simply move the mouse pointer around the image without the use of the polygons. The position of the mouse pointer represents the first vertex of the template area polygon, and the template pixels are automatically pasted onto the target area in real time at each new position of the mouse pointer. Therefore, as the user moves the mouse pointer, he can see the content of the target being replaced by pixels at the new mouse position.

Figure 6A:
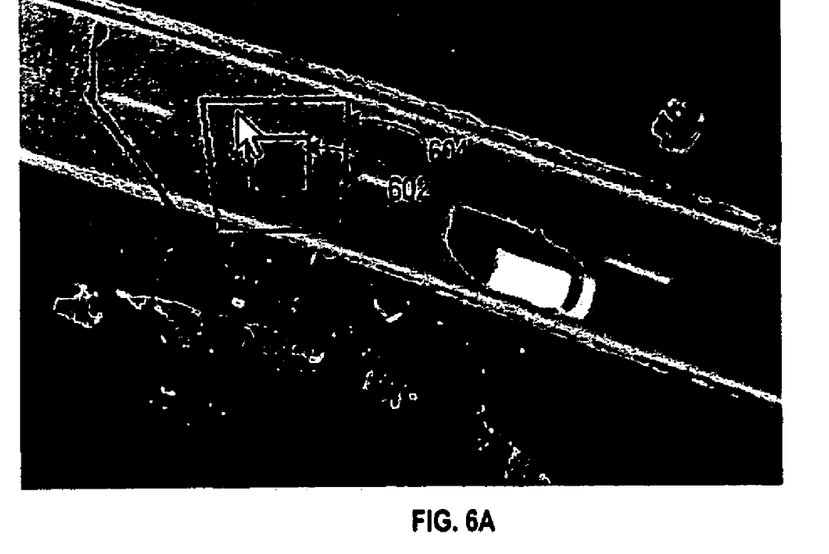
FIGS. 6A-B depict an exemplary embodiment of feathering according to the present invention.
Figure 6B:
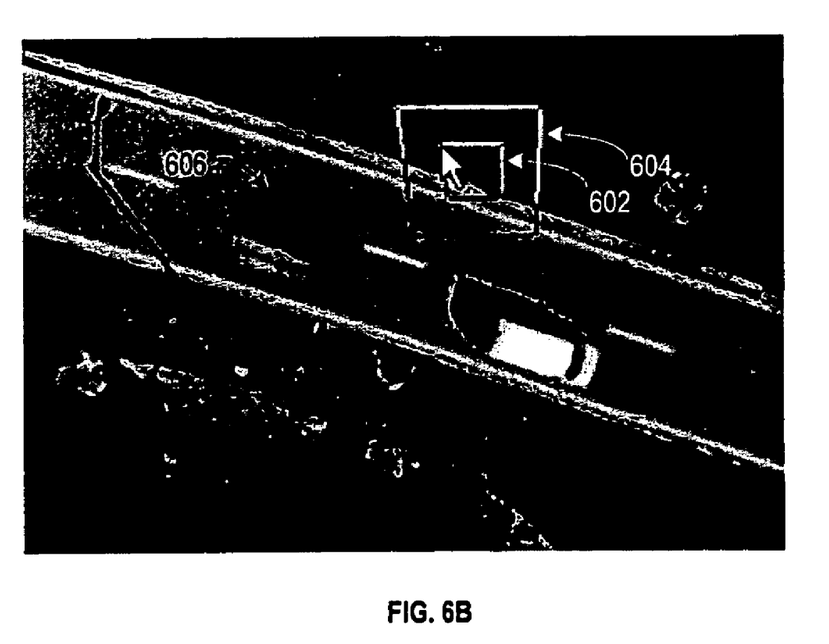

FIGS. 6A-B show another example of the feathering that occurs during the template selection process. In FIG. 6A, the template and feathering area polygons, 602 and 604, respectively, are in position over the target area that will be replaced. In FIG. 6B, the template and feathering area polygons 602, 604 are moved over a part of the image that shows grass. The corresponding target area 606 shows the grass in the target, but the grass pixels in the template feathering area polygon 604 are not seen next to the target area 606. Instead, those pixels are feathered out with increasing transparency over the underlying road image.

When the user has found a good position that produces realistic and seamless integration of the pasted data with the surrounding of the target, he can accept the template area in step 110. This stops the template choice tool and removes the floating template polygons, as seen in FIG. 5H. Alternatively, the user can cancel the process and the pixels of the target area then retrieve their original value, i.e., their value prior to the removal of the object.

In an exemplary embodiment of the present invention, the user can click the left mouse button at the chosen template location to accept the choice, or click using the right mouse button to cancel the operation.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents. For example, the order of the steps described above may vary.

What is claimed is:

1. A method for removing an area from a raster image, comprising the steps of:
   defining a target area in a raster image, said raster image having a plurality of pixels and an object area comprised of a first subset of said pixels, and said target area comprising said object area enclosed by a contour;
   defining a resizable target feathering area enclosing said target area, having an inner edge abutting said contour enclosing said target area, and comprising a second subset of pixels not including said first subset of pixels;
   defining a movable template area comprising a third subset of pixels and a template feathering area comprising a fourth subset of pixels;
   copying said template area pixels to said target area and said template feathering area pixels to said target feathering area, replacing said first subset of pixels of said object area; and
   selecting said template area.

2. The method of claim 1, wherein defining said target feathering area comprises enclosing said target area with a second contour having a shape substantially the same as said contour enclosing said target area.

3. The method of claim 2, wherein said contours are polygons.

4. The method of claim 3, wherein said second polygon has sides parallel to corresponding sides of said polygon enclosing said target area.

5. The method of claim 3, wherein said target area definition step further comprises:
   receiving input from an input device to select vertices of said polygon; and
   connecting adjacent ones of said vertices to form said polygon.

6. The method of claim 1, wherein said target feathering area is larger than said target area.

7. The method of claim 6, further comprising receiving input regarding movement of an input device pointer in relation to the position of said target area; and adjusting the size of said target feathering area based on said movement.

8. The method of claim 1, further comprising feathering said pixels copied into said target feathering area.

9. The method of claim 8, wherein said feathering of said pixels copied into said target feathering area comprises applying a graduated transparency to said copied pixels copied into said target feathering area.

10. The method of claim 1, further comprising:
    receiving input from an input device to move said template area and said template feathering area;
    moving said template area and said template feathering area to a different location of said image comprising a third subset of pixels; and
    copying said third subset of pixels to said target area and said fourth subset of pixels to said target feathering area.

11. The method of claim 1, wherein said template area is defined to have the same size, shape and configuration as said target area and said template feathering area is defined to have the same size, shape and configuration as said target feathering area.

12. A computer system for removing an object from a raster image, comprising:
    a target area definition tool, operative to define a polygonal target area in a raster image, wherein said target area and said raster image comprise a plurality of pixels;
    a feathering area definition tool, operative to define a target feathering area around said target area;
    a template choice tool, operative to replace pixels in said target area with pixels in a template and to receive template area and template feathering area input from a user;
    means for receiving a user selection of said template; and
    means for causing an area defined by said template area and template feathering area input to be displayed in said target area and said target feathering area, respectively.

13. The computer system of claim 12, wherein said target area is enclosed in a contour.

14. The computer system of claim 13, wherein said contour is a polygon, and wherein said target area definition tool further comprises:
    means for receiving input from an input device to select vertices of said polygon; and
    means for connecting adjacent ones of said vertices to form said polygon.

15. The computer system of claim 14, wherein said target feathering area is a polygon having sides parallel to corresponding sides of said target area polygon.

16. The computer system of claim 12, wherein said target feathering area has a shape substantially the same as the shape of said target area.

17. The computer system of claim 12, wherein said target feathering area is larger than said target area.

18. The computer system of claim 17, wherein the size of said target feathering area is determined by movement of an input device pointer in relation to the position of said target area.

19. The computer system of claim 12, wherein said feathering area definition tool further comprises:
    means for copying pixels from said template feathering area to said target feathering area; and
    means for feathering said pixels copied into said target feathering area.

20. The computer system of claim 19, wherein said feathering of said pixels copied into said target feathering area comprises a graduated transparency to said copied pixels.

21. The computer system of claim 12, wherein said template choice tool further comprises: means for moving said template and said template feathering area to a different location of said image and updating said target area and said target feathering area with pixels from said different location.

22. A computer useable information storage medium storing computer readable program code for causing a computer to perform the steps of:
    defining a target area in a raster image, said raster image having a plurality of pixels and an object area comprised of a first subset of said pixels, and said target area comprising said object area enclosed by a contour;
    defining a resizable target feathering area enclosing said target area, having an inner edge abutting said contour enclosing said target area, and comprising a second subset of pixels not including said first subset of pixels;
    defining a movable template area comprising a third subset of pixels and a template feathering area comprising a fourth subset of pixels;
    copying said template area pixels to said target area and said template feathering area pixels to said target feathering area, replacing said first subset of pixels of said object area; and
    selecting said template area.

23. The computer useable information storage medium of claim 22, wherein defining said target feathering area comprises enclosing said target area with a second contour having a shape substantially the same as said contour enclosing said target area.

24. The computer useable information storage medium of claim 23, wherein said contours are polygons.

25. The computer useable information storage medium of claim 24, wherein said second polygon has sides parallel to corresponding sides of said target area polygon.

26. The computer useable information storage medium of claim 24, wherein said target area definition step further comprises:
receiving input from an input device to select vertices of said polygon; and
connecting adjacent ones of said vertices to form said polygon.

27. The computer useable information storage medium of claim 22, wherein said target feathering area is larger than said target area.

28. The computer useable information storage medium of claim 22, further comprising program code for causing a computer to perform the steps of receiving input regarding movement of an input device pointer in relation to the position of said target area; and adjusting the size of said target feathering area based on said movement.

29. The computer useable information storage medium of claim 22, further comprising program code for causing a computer to perform the steps of feathering said pixels copied into said target feathering area.

30. The computer useable information storage medium of claim 29, wherein said feathering of said pixels copied into said target feathering area comprises applying a graduated transparency to said pixels copied into said target feathering area.

31. The computer useable information storage medium of claim 22, further comprising program code for causing a computer to perform the steps of:
receiving input from an input device to move said template area and said template feathering area;
moving said template area and said template feathering area to a different location of said image comprising a third subset of pixels; and
copying said third set of pixels to said target area and said target feathering area.

32. The computer useable information storage medium of claim 22, wherein said template area is defined to have the same size, shape and configuration as said target area and said template feathering area is defined to have the same size, shape and configuration as said target feathering area.

33. A method in a computer for removing an area from a raster image, comprising the steps of:
causing an image to be displayed to a user;
providing a target area definition tool to the user;
receiving target input from the user via said target area definition tool;
defining a target area in the image based on said target input;
providing a feathering area definition tool to the user;
receiving feathering input from the user via said feathering area definition tool;
defining a target feathering area in the image based on said feathering input;
providing a template choice tool to the user;
receiving template area and template feathering area input from the user via the template choice tool; and
causing an area defined by said template area and template feathering area input to be displayed in said target area and said target feathering area, respectively.

34. The method of claim 33, further comprising receiving resizing input from the user and resizing said target feathering area.

35. The method of claim 33, further comprising changing the area displayed in said target area and said target feathering area based on said template area and template feathering area input.

36. A method for adjusting a feathering area in a raster image, comprising the steps of:
(a) receiving a first input from a user selecting a processing area on which to apply a process in a raster image, wherein said raster image comprises a plurality of pixels, said processing area comprises a subset of said plurality of pixels;
(b) defining a feathering area enclosing said processing area, having an inner edge abutting said processing area, and comprising a second subset of pixels not including said first subset of pixels;
(c) receiving a second input from the user by way of an input device movement in relation to a center of said processing area;
(d) changing the size of said feathering area based on said input device movement;
(e) applying said process on said processing area of said raster image;
(f) feathering the intensity of the application of said process on said second subset of pixels in said feathering area;
(g) repeating said steps (c), (d) and (f) each time the input device is moved to a different location in said raster image; and
(h) receiving a third input from the user accepting the results of said feathering.

37. The method of claim 36, wherein said process comprises a modification at least one of the color and the intensity of said subset of pixels.

* * * * *